US 6,553,472 B2

(12) United States Patent
Yang et al.

(10) Patent No.: US 6,553,472 B2
(45) Date of Patent: Apr. 22, 2003

(54) METHOD FOR PROGRAMMING CLOCK DELAYS, COMMAND DELAYS, READ COMMAND PARAMETER DELAYS, AND WRITE COMMAND PARAMETER DELAYS OF A MEMORY CONTROLLER IN A HIGH PERFORMANCE MICROPROCESSOR

(75) Inventors: Liuxi Yang, Sunnyvale, CA (US); Duong Tong, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/759,480

(22) Filed: Jan. 12, 2001

(65) Prior Publication Data

US 2002/0138686 A1 Sep. 26, 2002

(51) Int. Cl.[7] ............................................... G06F 13/14
(52) U.S. Cl. ..................... 711/167; 711/154; 711/105; 711/170; 713/400; 365/233; 365/194; 365/201
(58) Field of Search ................................. 711/167, 154, 711/105, 170; 365/233, 194, 201, 230.06; 713/600, 500, 400; 714/700

(56) References Cited

U.S. PATENT DOCUMENTS 5,857,095 A * 1/1999 Jeddeloh et al. ............ 711/100
5,886,948 A * 3/1999 Ryan ........................... 365/194
5,917,761 A * 6/1999 Tietjen et al. ............... 365/194
6,073,223 A * 6/2000 McAllister et al. ......... 365/227
6,137,734 A * 10/2000 Schoner et al. ............. 365/194
6,292,903 B1 * 9/2001 Coteus et al. ............... 713/401
6,370,067 B1 * 4/2002 Ko et al. ..................... 365/194
6,389,522 B1 * 5/2002 Usami ......................... 711/167
6,397,312 B1 * 5/2002 Nakano et al. .............. 365/193

FOREIGN PATENT DOCUMENTS

| EP | 0 855 653 A1 | 7/1998 | ........... G06F/13/42 |
| WO | WO 00/20978 | * 4/2000 | |

OTHER PUBLICATIONS

International Search Report dated Aug. 19, 2002, European Patent Office.

* cited by examiner

Primary Examiner—Hong Kim
(74) Attorney, Agent, or Firm—Rosenthal & Osha L.L.P.

(57) ABSTRACT

A method for programming a controller of a memory unit has been developed. The method includes inputting variable initialization parameters of the memory unit and a clock delay and a command delay for each parameter. Based on each pair of clock delays and command delays, calculate a set of delays for a read command and a write command. Calculate the system performance for each pair of clock and command delays bases on the read and write delays and select the initial parameters that offer optimum system performance.

7 Claims, 7 Drawing Sheets

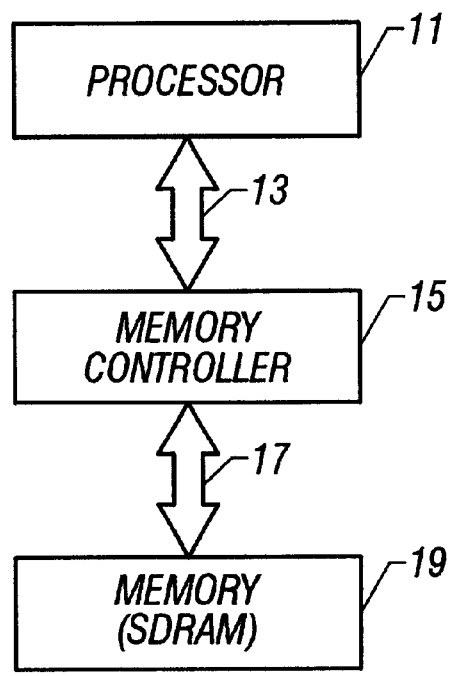
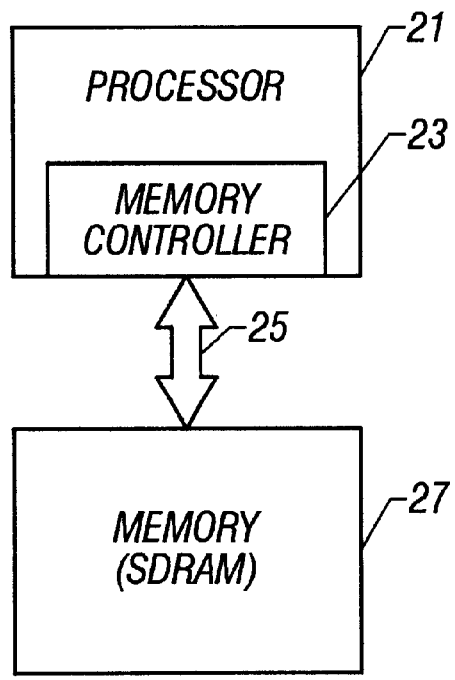
FIG. 1A  FIG. 1B
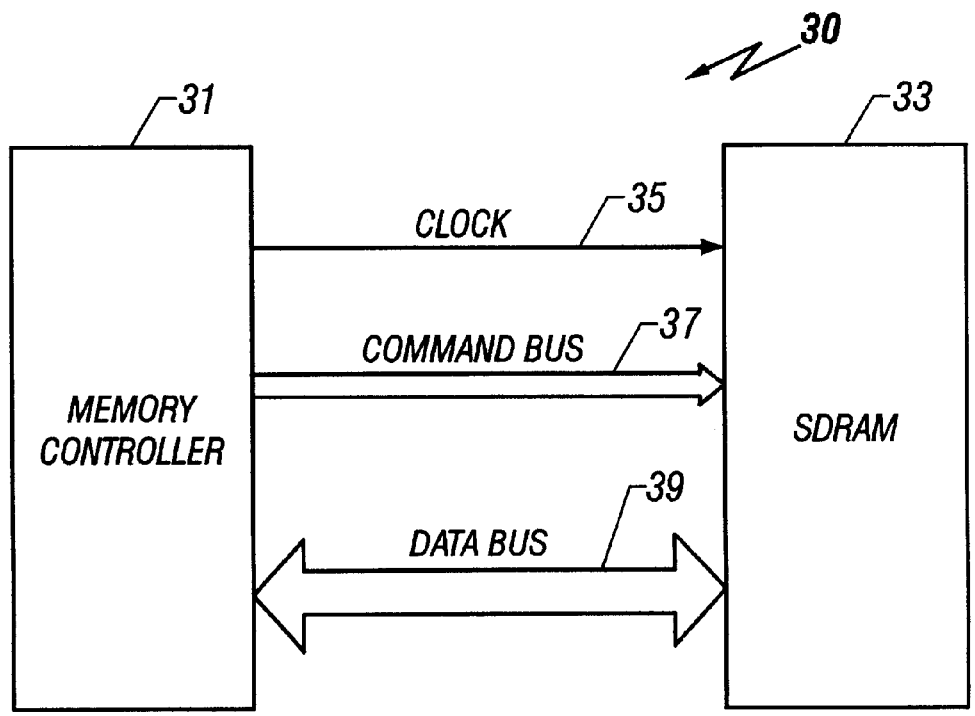
FIG. 2

METHOD FOR PROGRAMMING CLOCK DELAYS, COMMAND DELAYS, READ COMMAND PARAMETER DELAYS, AND WRITE COMMAND PARAMETER DELAYS OF A MEMORY CONTROLLER IN A HIGH PERFORMANCE MICROPROCESSOR

FIELD OF THE INVENTION

This invention relates to programming memory controllers for computer systems.

BACKGROUND OF THE INVENTION

In computer system operations, a memory controller (MC) driven by a Central Processing Unit (CPU) interacts with an outside memory. A CPU in a single integrated circuit chip is often referred to as a microprocessor. A memory controller may be outside of the microprocessor chip or it may reside inside. An MC resident inside the microprocessor chip can operate at the speed of the processor clock, which indicates the computer speed. In modern, high performance computer systems, synchronous dynamic random access memory (SDRAM) is typically used as the outside memory. The clock for the SDRAM operates at a speed many times lower than the processor clock.

Signals passing between the MC and the SDRAM take a finite time to travel, and both the MC and the SDRAM take a finite time to respond. Thus, time delays are associated with the finite speed of signal travel and the finite response time of a device or a system. These time delays have their origins in the physical processes involved in the construction and operation of electronic devices that make up the computer system. Therefore, various time delays encountered in computer operations can be minimized or optimized, but cannot be eliminated. Reliable computer design must take into account all significant time delays affecting computer operation.

Certain time delays are always significant, and thus must be taken into account in the design of the MC for input/output operations. Significance of some other time delays is measured with respect to the time period of the processor clock. Therefore, as the computer speed increases, various additional time delays have to be taken into account to ensure reliable operation of the MC. In computer input/output operations involving an MC and a SDRAM, signals originating in the MC do not appear instantaneously at the SDRAM, and vice-versa, due to propagation delays. Further, various time delays associated with a SDRAM depend on that specific SDRAM and its actual physical layout in the computer circuit board. Thus, the signaling delays between an MC and a SDRAM vary from system to system due to different types of system configurations and memory performance specifications.

Computer operations such as the input/output (I/O) operations are synchronized with the processor clock. The I/O operations take place around precise digital transitions in logic gates and flip flops constituting digital devices and systems. In order to make computer operations reliable, (e.g., a data read from a memory) it is necessary to hold a participating signal (e.g., a command signal) stable for a short time before and after the precise transition moment. Such time considerations, together with the various time delays mentioned earlier, constitute a significant fraction of the clock time period.

A memory controller in a digital computer typically will have the capability of generating a replica of the processor clock signal delayed by half a time period. This creates a digital time delay unit of half a processor clock period. This digital time delay unit along with the aforementioned analog time delays inherently present in the computer system dictates the programmed design of the MC for reliable input/output operations with the SDRAMs.

Digital signals for communications between the MC and the SDRAM fall into three categories: clock signals; command signals; and data signals. In a computer system, multiple signal lines constitute both the command and data paths. All communicating I/O signals must be designed to flow in concert in order to produce the right digital transitions at the right time. Precise timing designs of all these signals may be done, for example, by "Firmwire", which is an embedded software contained in an erasable Programmable Read Only Memory (EPROM) or a flash memory. The present technique of MC programming design has been to use a spreadsheet to store all possible timing combinations and to manually design suitable solutions. Such exercises are specific for a particular system configuration. This becomes more difficult as the number of time delay elements to be considered increases with the increase in processor clock speed, and design may not be optimized for highest achievable performance. It has become necessary, therefore, to define the design problem with mathematical precision and create a general algorithm to solve it.

SUMMARY OF THE INVENTION

In one aspect, the invention relates to a method for programming a controller of a memory unit comprising: inputting a plurality of initialization parameters of the memory unit; calculating a clock delay and a command delay for each initialization parameter; calculating a set of read command delays for each pair of clock delays and command delays; calculating a set of write command delays for each pair of clock delays and command delays; calculating a system performance for each pair of clock delays and command delays; selecting the initialization parameter that offers the optimum system performance.

Other aspects and advantages of the invention will be apparent from the following description and the appended claims.

BRIEF DESCRIPTION OF THE DRAWINGS

FIG. 1a is a schematic diagram of a computer system showing a processor interconnected with an external memory controller and a memory (SDRAM).

FIG. 1b is a schematic diagram of a computer system showing a processor with an internal memory controller connected to a memory (SDRAM).

FIG. 2 is a block diagram describing SDRAM access by a memory controller.

DETAILED DESCRIPTION OF THE INVENTION

Figure 3:
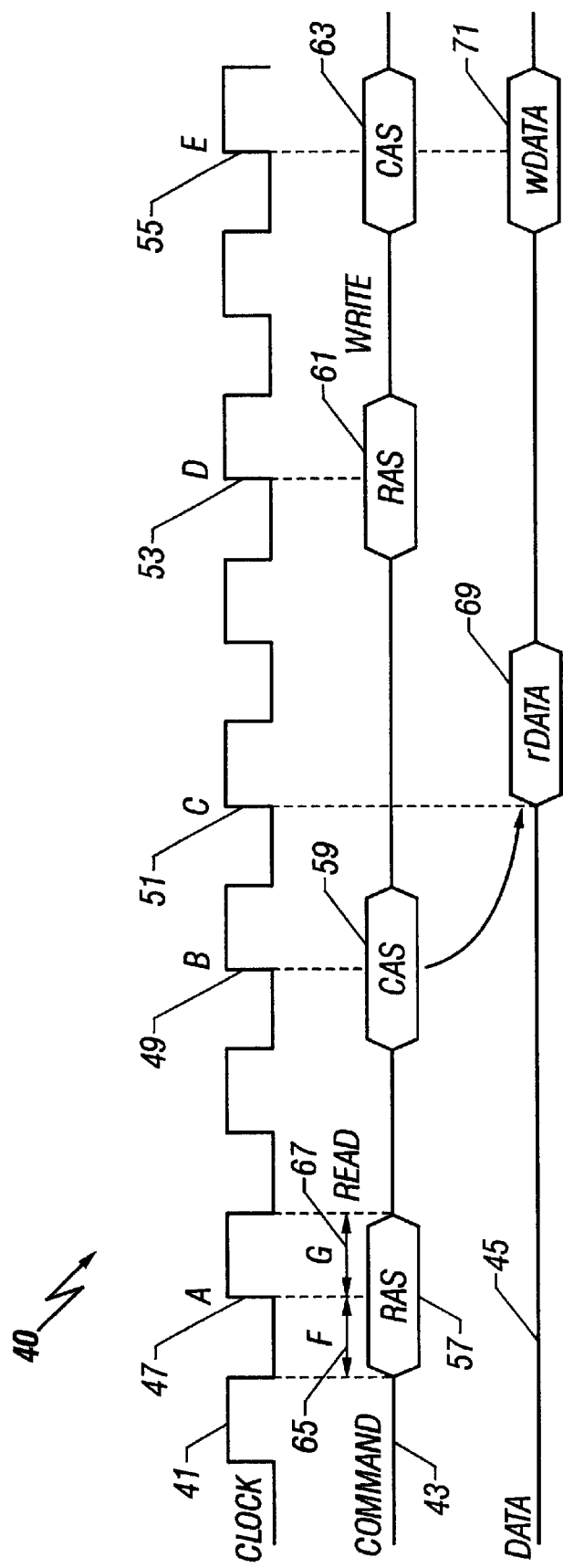
FIG. 3 is a timing diagram describing SDRAM read and write operations.

The present invention relates to methods for programming memory controllers to correctly and optimally perform input/output operations with outside memory like a SDRAM. The method of the invention provides systematic analysis of various time delays and time constraints inherently present in the operation of devices and systems like a SDRAM. Deliberate programmable time delays may be introduced at the MC to serve as design elements. One such time delay element is the processor clock time period, which is the smaller digital time unit. The other is the SDRAM clock time period, the larger digital time unit. With these two digital time delay input parameters, along with an analog delay element (SDRAM device parameters and system input parameters involving propagation delays), correct and optimal timings in communications between an MC and a SDRAM are then systematically designed. Exemplary embodiments of this systematic method for programming an MC to provide high speed and efficient input/output operations with an external memory are described below with reference to the attached Figures.

FIG. 1a is a schematic diagram of a computer system showing a processor 11 connected (13) with an external Memory Controller (MC) 15. The MC 15 is connected (17) to an external memory 19 for input/output operations.

FIG. 1b is a schematic diagram of a computer system showing a processor 21 with a memory controller 23 resident in the processor. The MC communicates (25) with the external memory 27. By having the MC inside the microprocessor chip allows the MC to operate at the processor clock speed. The MC then could be designed to have faster external memory (SDRAM) access for input/output (I/O) operations.

FIG. 2 depicts a typical SDRAM controller hookup 30. Communicating signals between the MC 31 and the SDRAM 33 are physically arranged in three groups: the clock signal 35; the unidirectional (from MC to SDRAM) command bus 37; and the bi-directional data bus 39. The command and data signals are sampled synchronously. The clock signal makes that synchronous computer operation possible.

FIG. 3 shows basic SDRAM read and write accesses 40. There are three signals shown in the plot: a clock signal 41; a command signal 43 and a data signal 45. They represent the signals at SDRAM I/O pins. The three signals correspond to the signal groups discussed in FIG. 2. Since SDRAMs operate synchronously with the clock, the commands must be sampled at a clock edge, e.g., a rising edge, shown in the figure as A 47; B 49, D 53; and E 55. For an SDRAM read or an SDRAM write, SDRAM receives a RAS (row address strobe) 57 and a CAS (column address strobe) 59 commands. Similarly for a SDRAM read or a SDRAM write, SDRAM receives a RAS 61 and a CAS 63 commands. The delay from a RAS to a CAS is defined as the RAS-CAS delay, which is an SDRAM parameter given by the SDRAM manufacturer. Systems use the smallest given RAS-CAS delay to achieve the best performance. To sample the commands correctly, the clock and the commands must satisfy the minimum setup time F 65 and minimum hold time G 67 given by the manufacturer. For a read operation, the data appears on the data bus at a clock rising edge C 51 (only cache latency 2 is shown). For a write operation, written data must be driven at the same time as the CAS command 63 so write data 71 is sampled the same time as the CAS command.

For the design of an algorithm to correctly program the MC, various time delays and time constraints (analog type time elements) associated with the physical operation of a memory device like a SDRAM need to be specified. Table 1 is an exemplary specification for a SDRAM. Not all listed parameters are needed for this algorithm development.

TABLE 1

| Parameter | Typical Time (ns) | Comment |
| --- | --- | --- |
| tRCD | 26 | RAS to CAS delay |
| tRP | 26 | Row pre-charge time |
| tRC | 78 | Row cycle time |
| tSAC2max | 7 | CLK to valid data out conflict |
| tOH2 | 2.5 | Output data hold CL = 2 |
| tSS | 2 | Input setup time |
| tSH | 1 | Input hold time |
| tSLZ | 0 | CLK to output active |
| tSHZ2min | 2 | CLK to hi-Z min, CL = 2 |
| tSHZ2max | 6 | CLK to hi-Z max, CL = 2 |

The programmable parameters for the MC required for correct and optimum I/O operation with the MC and SDRAM need to be specified. Table 2 lists and describes seventeen related programmable parameters in the MC. Other programmable parameters, such as refresh control and SDRAM initialization parameters are not listed. These timing parameters are necessary for I/O operations such as memory read, memory write, same bank access, different bank access, etc.

TABLE 2

| Parameter | Description |
| --- | --- |
| Clkr | SDRAM to processor clock ratio |
| Clk_dly | SDRAM clock delay with respect to MCU base clock (processor clock unit) |
| Cmd_dly | SDRAM command delay (SDRAM cycle unit) |
| Act_rd_dly | Read command RAS to CAS delay (SDRAM cycle unit) |
| Act_wr_dly | Write command RAS to CAS delay (SDRAM cycle unit) |
| Rd_cycl_dly | Wait tRP after a read command is issued (SDRAM cycle unit) |
| wr_cycl_dly | Wait tRP after a write command is issued (SDRAM cycle unit) |
| Rd_smp_dly | Wait to sample a read data after a read command is issued (processor clock unit) |
| wr_Psh_dly | Wait to push the write data out after a write command is issued (processor clock unit) |
| Rd_wait | Read data valid extension (SDRAM cycle unit) |
| wr_thld | Write data valid extension (processor cycle unit) |
| Auto_rfr_cycle | wait for auto refresh finishes (SDRAM cycle unit) |
| Rd_rd_dly | delay for a read allowed to other banks after current read (SDRAM cycle unit) |
| Rd_wr_dly | delay for a write allowed to other banks after current read (SDRAM cycle unit) |
| wr_rd_dly | delay for a read allowed to other banks after current write (SDRAM cycle unit) |
| wr_wr_dly | delay for a write allowed to other banks after current write (SDRAM cycle unit) |
| Rrd | RAS to RAS delay of SDRAM internal banks (SDRAM cycle unit) |

Table 3 lists required system input parameters for calculating MC programming parameters. Ten important parameters are listed and described. These system parameters are needed as inputs to the design method. This table describes an exemplary development process.

TABLE 3

| Parameter | Description |
| --- | --- |
| cmd_delay_min | Command delay minimum |
| cmd_delay_max | Command delay maximum |
| clock_delay_min | Clock delay minimum |
| clock_delay_max | Clock delay maximum |
| sdram_mc_data delay_min | data SDRAM to MC delay minimum |
| sdram_mc_data delay_max | data SDRAM to MC delay maximum |
| mc_sdram_data delay_min | data MC to SDRAM delay minimum |
| mc sdram_delay_max | data MC to SDRAM delay maximum |
| mc_data_setup | MC read data setup time |
| mc_data hold | MC read data hold time |

In estimating the design parameters described in Table 2 for design development, it is necessary to characterize and to estimate various design input parameters. Some time delay elements arise from signal propagation delays. Electrical signals take a finite amount of time to travel a finite distance in an integrated circuit. As the processor clock speed increases, these time delay elements become more significant. When a propagation delay becomes a significant fraction of the processor clock period, it needs to be accounted through correct and reliable I/O timing designs, involving an MC and a SDRAM. These time delay elements are analog types dependent on the physical layout of the computer hardware.

Figure 4:
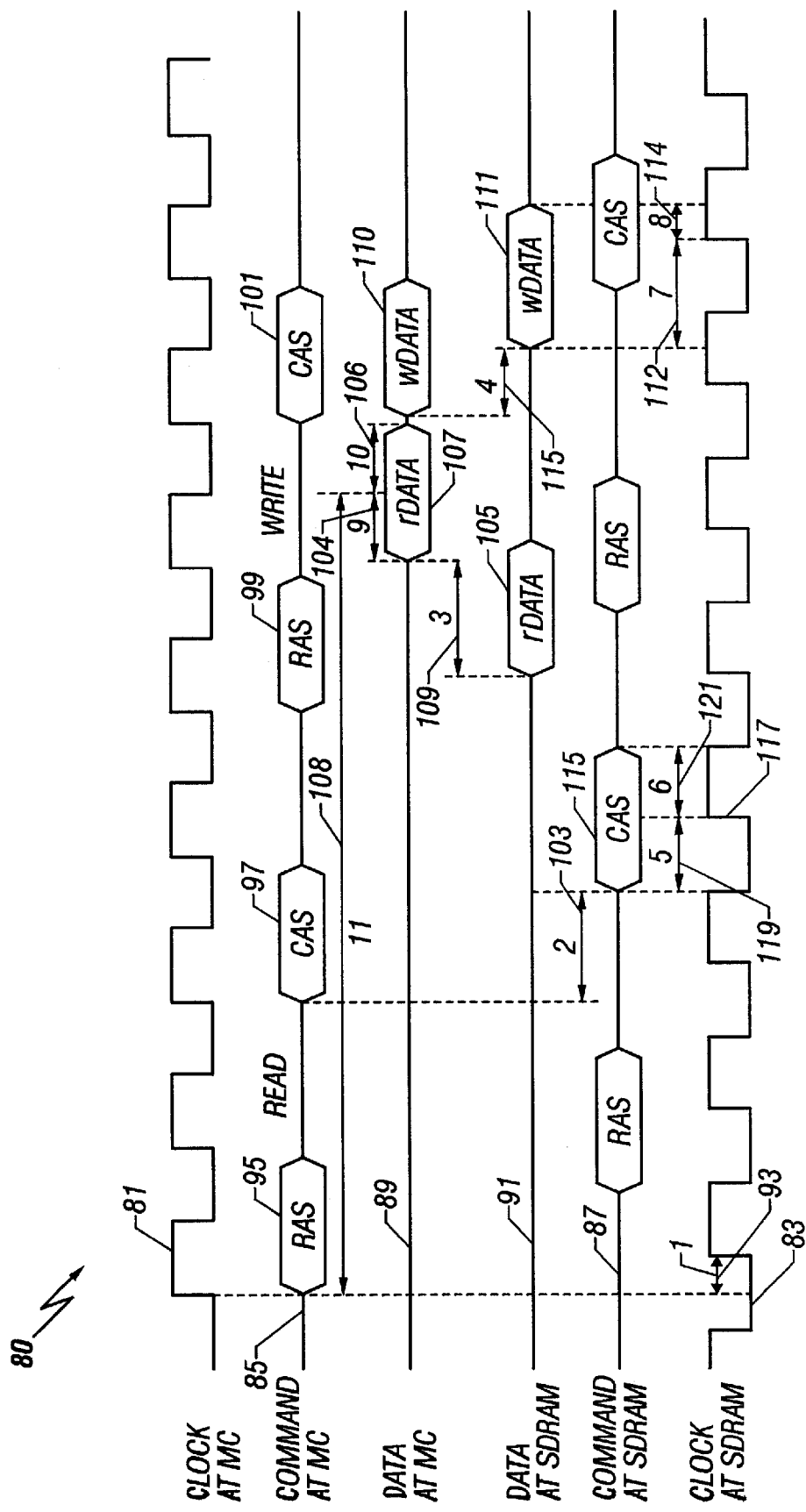
FIG. 4 is a timing diagram depicting analog delays of various computer signals.

FIG. 4 shows the analog delays between an MC and a SDRAM. Six signal waveforms are shown in plot 80, representing the signals at both MC and SDRAM I/O pins. The upper three signals 81, 85, and 89 correspond to the signal groups in FIG. 2 for the MC I/O pins. The lower three signals 83, 87, and 91 correspond to the signal groups in FIG. 2 at SDRAM I/O pins. Clock signals 81 and 83 are unidirectional from the MC to the SDRAM. Command bus signals 85 and 87 are unidirectional from the MC to the SDRAM. The data bus signals 89 and 91 are bi-directional between the MC and the SDRAM.

Analog clock_delay 93 is the clock signal's delay from the MC to the SDRAM. Clock_delay varies within the range of clock_delay_min and clock_delay_max provided as system input parameters (Table 3). The following relation holds:

$$\text{clock\_delay\_min} < \text{clock\_delay} < \text{clock\_delay\_max} \quad (EQ\ 1)$$

The analog cmd_delay 103 is the command bus signal's delay from the MC to the SDRAM. The cmd_delay varies within the range of cmd_delay_min and cmd_delay_max as system input parameters (Table 3). The following relation holds:

$$\text{cmd\_delay\_min} < \text{cmd\_delay} < \text{cmd\_delay\_max} \quad (EQ\ 2)$$

The analog sdram_mc_data_delay 109 is the data delay from the SDRAM to the MC for a read operation. The sdram_mc_data_delay varies within the range of sdram mc_data_delay_min and sdram_mc_data_delay_max provided as system input parameters (Table 3). For this delay the following relation holds:

$$\text{sdram\_mc\_data\_delay\_min} < \text{sdram\_mc\_data\_delay} < \text{sdram\_mc\_data\_delay\_max} \quad (EQ\ 3)$$

The analog mc_sdram_data_delay 113 is the data delay from the MC to the SDRAM for a write operation. The mc_sdram_data_delay varies within the range of mc_sdram_data_delay_min and mc_sdram_data_delay_max provided as system input parameters (Table 3). For this delay the following relation holds:

$$\text{mc\_sdram\_data\_delay\_min} < \text{mc\_sdram\_data\_delay} < \text{mc\_sdram\_data\_delay\_max} \quad (EQ\ 4)$$

The MC must guarantee the commands and data are correctly sampled at the MC and/or the SDRAM. The commands must satisfy setup time 119 and hold time 121 given by the SDRAM specifications. As shown in FIG. 4, for a read operation, the MC must be programmed internally to sample with delay 108, to get data with setup time 104 and hold time 106, to satisfy MC I/O specifications. As noted earlier, data 107 at the MC is the same data 105 at the SDRAM, which arrived with time delay 109. For a write operation, the MC must control data 111 to be sampled at the SDRAM with setup time 112 and hold time 114 to satisfy the SDRAM specification.

To satisfy the above setup time and hold time at the right time for variant system designs, the MC must be programmable. The programmable parameters, described in Table 2, compensate for the appropriate time delays by the correct amount to achieve the best timing and performance in the MC to SDRAM I/O operations.

Figure 5:
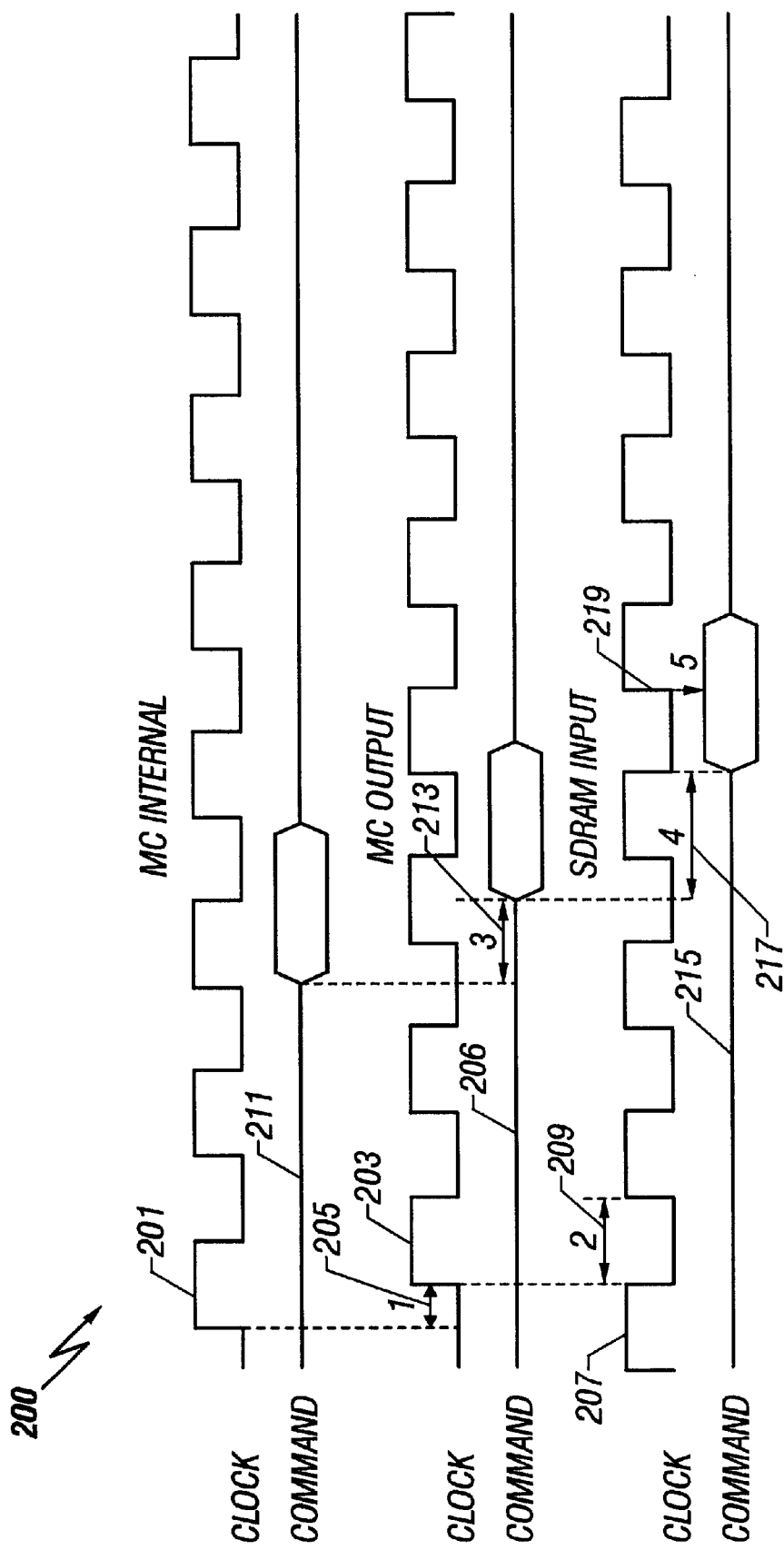
FIG. 5 is a timing diagram showing clock and command signal programming.

FIG. 5 depicts MC clock and command programming 200. It does not include analog delays due to propagation path delays as discussed in FIG. 4. The MC, resident in a microprocessor, is able to generate a delayed version 203 of clock 201 with delay (clk_dly) 205 in CPU clock resolution. The programmable digital delay 205 in the CPU clock resolution produces a corresponding programmed delay 213 in command signal 206 at the MC output.

Internally, the MC has a base signal that is always synchronous with the clock and which has SDRAM clock resolution. The SDRAM clock rate is slower, (typically 4–15 times), than the CPU (microprocesor) clock rate. Additionally, the MC is able to generate the commands with programmable delay (cmd_dly) 209 in the SDRAM input clock 207 in SDRAM clock resolution resulting in a corresponding, programmed delay 217 in the command signal 215 input at SDRAM. Therefore, by programming the clk_dly 205 in CPU clock resolution and cmd_dly 209 in SDRAM clock resolution, and taking into account the analog delays clk_delay and cmd_delay, shown in FIG. 4, (not included in FIG. 5), the command to SDRAM is sampled at a rising edge 219 of SDRAM clock 207. Let tSS be the set up time and tSH be the hold time specified by the SDRAM specification, and let clkr be the clock frequency ratio of the processor and SDRAM which is the same as the SDRM to processor clock period ratio. For the setup time, the following relation holds:

$$\text{clk\_dly} + \text{clock\_delay\_min} + N\ \text{clkr} - tSS > \text{cmd\_dly} + \text{cmd\_delay\_max} \quad (EQ\ 5)$$

In addition, for the hold time, the following relation holds:

$$\text{clk\_dly} + \text{clock\_delay\_max} + N\ \text{clkr} + tSH < \text{cmd\_dly} + \text{cmd\_delay\_min} \quad (EQ\ 6)$$

where N is an integer number satisfying both inequalities. The programmable delays clk_dly and cmd_dly need to be produced in discrete units in the range {0, 1, . . . clkr−1}. To obtain the legal settings for clk_dly and cmd_dly the following steps need to be executed:

(i). Set cmd_dly={0, 1, . . . clkr−1}

(ii). Vary clock_dly from 0 to clkr−1;

(iii). Substitute the above values into the relation involving wr_psh_dly (wait time to push the write data out in processor clock unit) in (EQ 19) derived below for write setup time to obtain best possible performance in terms of idle latency. Check the validity of the current cmd_dly and sdram_clk-dly values chosen. The valid settings can be obtained based on the iterations of the above three steps.

Figure 6:
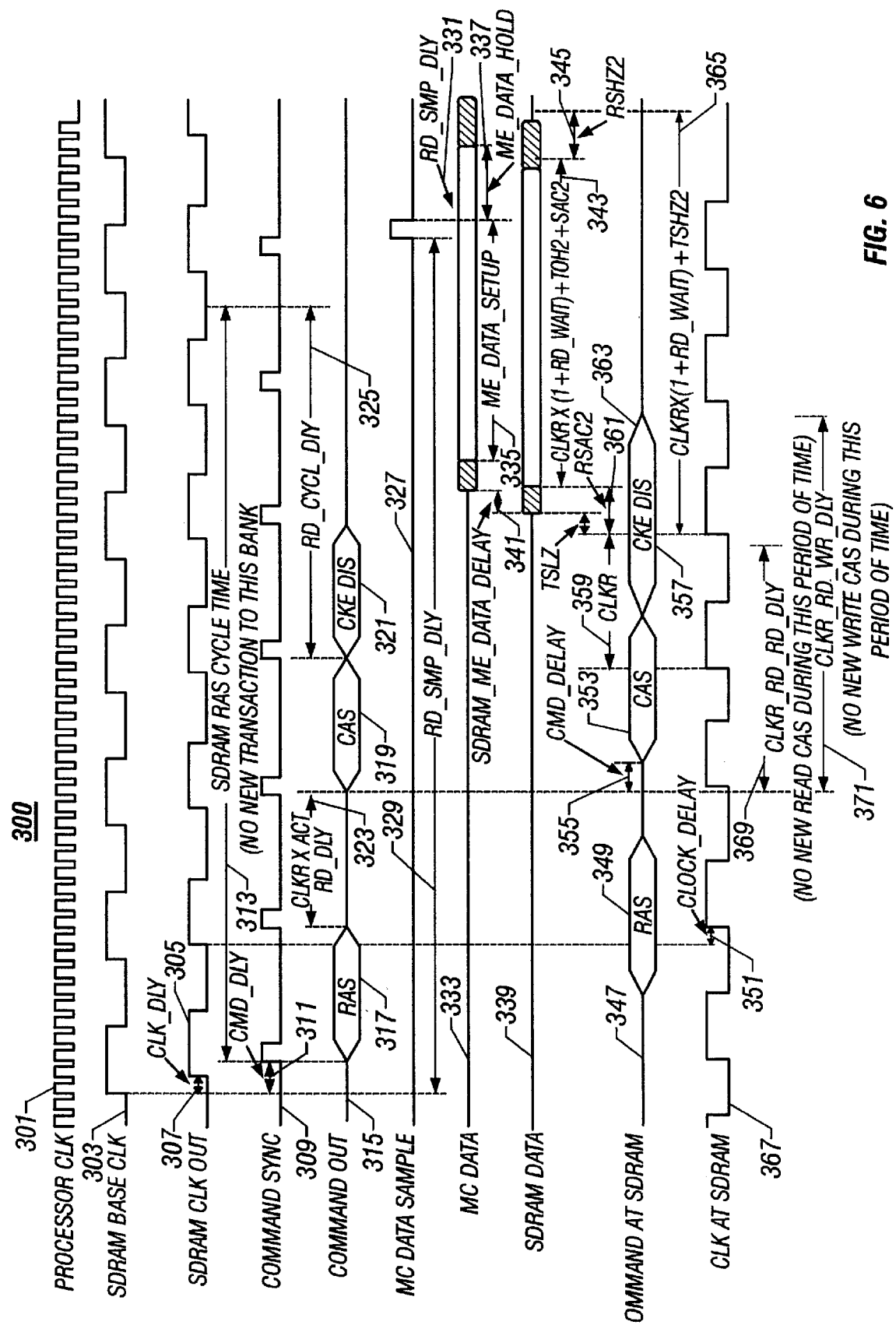
FIG. 6 is a timing diagram describing SDRAM read operation.

A read operation will now be considered to generate correct MC programmable parameters, which pertain to the read operation. Toward this end, the SDRAM read timing diagram 300 in FIG. 6 will be considered. This diagram is a simplified version of a SDRAM read timing of a recent actual CPU: UltraSPARC-III.

The first signal 301 is the processor internal clock. The second signal 303 is the MC internal base SDRAM clock. The SDRAM clock period is always a multiple of the processor clock period. The third signal line 305 represents the SDRAM clock at the MC I/O pin. It has a programmable delay (clk_dly) 307 with respect to the internal SDRAM clock base. The fourth signal 309 is the SDRAM command sync signal. All SDRAM commands must be synchronized to this signal. It has a programmable delay (cmd_dly) 311 with respect to the internal SDRAM clock base. The fifth signal 315 represents the MCU command output at MC I/O pins. The three commands on the command bus are the RAS command, 317, the CAS command, 319 and the CKE DIS deassertion command, 321. When CKE is deasserted, the data valid will be extended by one SDRAM cycle. The sixth signal 327 is the data sampling signal. The memory read data will be sampled into MC with the rd_smp_dly 329 with respect to the SDRAM internal base clock, 303. The seventh signal 333 is the SDRAM data 339 reaching the MC I/O pins after a time delay (sdram_mc_data_dly) 341. The hollow part of the data signal represents the valid portion. It consists of MC read data setup time 335 and MC read data hold time 337. The eighth signal 339 is the SDRAM data driven out from the SDRAM I/O pins. The ninth signal 347 is the SDRAM command signal reaching SDRAM I/O pins after a time delay (cmd_dly) 355. The tenth signal 367 is the SDRAM clock reaching the SDRAM pins after a time delay (clk_dly) 351. There will be no new read CAS during the period of time (clkr x rd_rd_dly) 369 and there will be no new write CAS during the period of time (clkr x rd_wr_dly) 371. The delays, set time and hold time, marked in FIG. 6, have been described in Tables 2 and 3.

For the read operation, the following parameters are to be calculated:

act_rd_dly (read command RAS to CAS delay);
  rd-wait (read data valid extension);
  rd_smp_dly (wait to sample a read data).

For the read command operations, the following relation must be satisfied:

$$clkr(1+act\_rd\_dly) > tRCD \quad (EQ\ 7)$$

Therefore, set $$act\_rd\_dly = Ceil(tRCD)/(clkr)) - 1 \quad (EQ\ 8)$$

Because act_rd_dly is the minimum possible legal setting, act_rd_dly in (EQ 8) gives the best possible performance in terms of read idle latency.

For read setup time, the following relation must be satisfied:

$$1+rd\_smp\_dly > clkr(1+act\_rd\_dly)+cmd\_delay\_max+ \\ Remainder(clk\_dly+clk\_delay\_max-cmd\_dly- \\ cmd\_delay\_max, clkr)+tSAC2-tSLZ+ \\ sdram\_mc\_data\_dly\_max+mc\_data\_setup \quad (EQ\ 9)$$

In addition, for read hold time, the following relation must be satisfied:

$$1+rd\_smp\_dly < clkr(1+act\_rd\_dly)+cmd\_delay\_min+ \\ Remainder(clk\_dly+clk\_delay\_min-cmd\_dly- \\ cmd\_delay\_min, clkr)+tOH2-tSLZ+ \\ sdram\_mc\_data\_dly\_min+(1+RD\_WAIT)clkr- \\ mc\_data\_hold \quad (EQ\ 10)$$

Given positive numbers X and Y, the Remainder function is defined such that R is a positive number that satisfies:

$$X = P \times Y + R \quad (EQ\ 11)$$

where P is an integer and 0<R<Y. R is denoted as:

$$R = Remainder(X,\ Y) \quad (EQ\ 12)$$

Therefore, let $$rd\_smp\_dly = Ceil(clkr(1+act\_rd\_dly)+cmd\_delay\_max+re- \\ mainder(clk\_dly+clk\_delay\_max-cmd\_dly-cmd\_delay\_ \\ max, clkr)+tSAC2-tSLZ+sdram\_mc\_data\_dly+mc\_data\_ \\ setup-1); \quad (EQ\ 13)$$

this results in, $$RD\_WAIT = Ceil((1+rd\_smp\_dly-cmd\_delay\_min-Remainder- \\ (clk\_delay\_min+clk\_dly-ctl\_dly-cmd\_delay\_min, clkr)- \\ tOH2+tSLZ-dram\_mc\_data\_dly\_min+mc\_data\_hold)/clkr- \\ 1-act\_rd\_dly). \quad (EQ\ 14)$$

RD_WAIT must be maintained as a positive number because no logic circuit can control past performance. Therefore, $$rd\_wait = RD\_WAIT - 1,\ if\ RD\_WAIT > 0; \quad (EQ\ 15)$$

$$rd\_wait = 0,\ if\ RD\_WAIT = 0; \quad (EQ\ 16)$$

The setting of write parameters can be obtained in a similar fashion.

Figure 7:
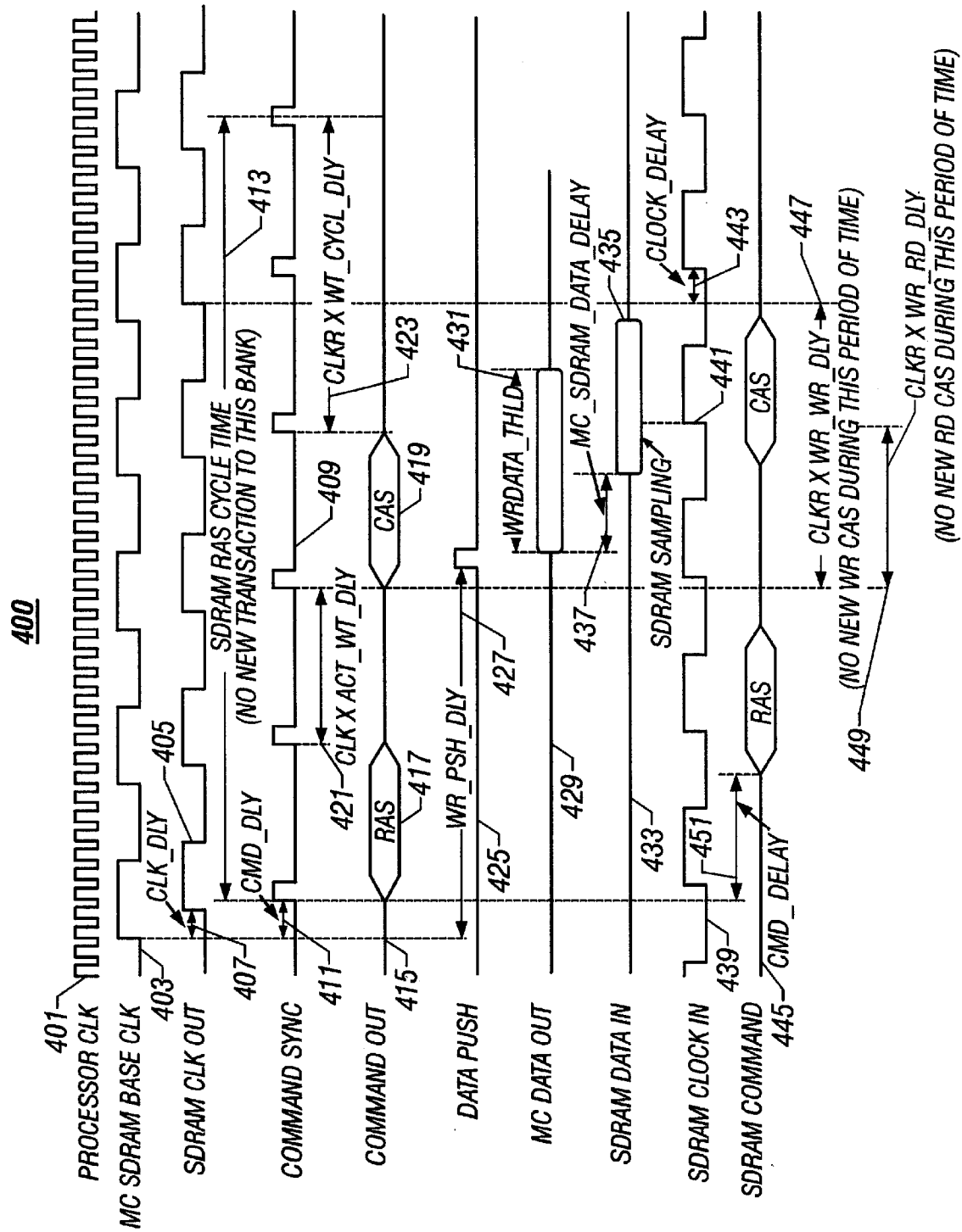
FIG. 7 is a timing diagram describing SDRAM write operation.

FIG. 7 is a simplified version of the SDRAM write timing diagram 400 (used in an actual CPU, the UltraSPARC-III). The first signal 401 is the processor internal clock. The second signal 403 is the MC internal base SDRAM clock. The SDRAM clock period is always a multiple of the processor clock period. The third signal line 405 represents the SDRAM clock at the MC I/O pin. It has a programmable delay 407 with respect to the internal SDRAM clock base. The fourth signal 409 is the SDRAM command sync signal. All SDRAM commands must be synchronous to this signal. It has a programmable delay (cmd_dly) 411 with respect to the internal SDRAM clock base. The fifth signal 415 represents the MCU command output at MC I/O pins. There are two commands on the command bus. They are RAS command 417 and CAS command 419. The sixth signal 425 is the data driving signal. The memory read data would be driven out from MC with the wr_psh_dly 427 with respect to SDRAM internal base clock. The seventh signal 429 is the SDRAM data out at the MC I/O pins. The eighth signal 433 is the SDRAM data reaching SDRAM I/O pins after a time delay (mc_sdram_data_dly) 437. The ninth signal 439 is the SDRAM clock reach the SDRAM pins after a propagation path time delay (clock_delay) 443. The tenth signal 445 is the SDRAM command signal reaching the SDRAM I/O pins after a propagation path time delay (cmd_delay) 451. The delays, set time and hold time marked in the figure, have been described in the Tables 2 and 3.

A memory WRITE operation is controlled by the following parameters:

act$_{wr}$_dly (write command RAS to CAS delay);
wr psh dly;
wrdata_thld (write data valid extension).

$$\text{clkr}(1+\text{act\_wr\_dly}) > \text{tRCD} \quad \text{(EQ 17)}$$

Therefore, $$\text{act\_wr\_dly} = \text{Ceil}((\text{tRCD}-\text{clkr})/\text{clkr}) \quad \text{(EQ 18)}$$

Because act_wr_dly is the minimum possible legal setting, act_wr_dly in EQ 18 gives the best possible performance in terms of idle latency.
For write setup time, it must satisfy $$1+\text{wr\_psh\_dly}+\text{mc\_dram\_dly\_max}+\text{tSS} < \text{clkr}(1+\text{act\_wr\_dly})+ \\ \text{cmd\_delay\_min}+\text{Remainder}(\text{clk\_dly}+\text{clk\_delay\_min}-\text{cmd\_} \\ \text{delay-cmd\_delay\_min, clkr}); \quad \text{(EQ 19)}$$

Hold time:

$$1+\text{wr\_psh\_dly}+\text{mc\_dram\_dly\_min}+\text{wrdata\_thld}-\text{tSH} > \text{clkr}(1+ \\ \text{act\_wr\_dly})+\text{cmd\_delay\_max}+\text{Remainder}(\text{clk\_dly}+\text{clk\_} \\ \text{delay\_max-cmd\_dly-cmd\_delay\_max, clkr}); \quad \text{(EQ 20)}$$

Therefore, let $$\text{wr\_psh\_dly} = \text{Floor}(\text{clkr}(1+\text{act\_wr\_dly})+\text{cmd\_delay\_min}+\text{Re-} \\ \text{mainder}(\text{clk\_dly}+\text{clk\_delay\_min-cmd\_dly-cmd\_delay\_min,} \\ \text{clkr})-1-\text{mc\_dram\_dly\_max}); \quad \text{(EQ 21)}$$

this results in, $$\text{wrdata\_thold} = \text{Ceil}(\text{clkr}(1+\text{act\_wr\_dly})+\text{cmd\_delay\_max}+\text{Re-} \\ \text{mainder}(\text{clk\_dly}+\text{clk\_delay\_max-cmd\_delay-cmd\_delay\_} \\ \text{max, clkr})-1-\text{wr\_psh\_dly-mc\_dram\_dly\_min}+\text{tSH}; \quad \text{(EQ 22)}$$

Programmable parameters to avoid conflicts will now be considered.
For same bank access, the following parameters are important:

rd_cycl_dly (wait for row precharge time tRP after a read command is issued);
wr_cycl_dly (wait for row precharge time tRP after a write command is issued);
auto-rfr-cycle (wait for auto refresh to finish).
For a bank access, we have:

$$\text{tRC-tRCD}+\text{RD\_WAIT}*\text{clkr} < \text{clkr}(1+\text{rd\_cycl\_dly})+\text{clk\_delay\_} \\ \text{max-ck\_delay\_min}; \quad \text{(EQ 23)}$$

$$\text{tRC'tRCD} = \text{clkr}(1+\text{wr\_cycl\_dly})+\text{clk\_delay\_max-clk\_delay\_} \\ \text{min} \quad \text{(EQ 24)}$$

$$\text{tRC} < \text{auto\_rfr\_cycle clkr} \quad \text{(EQ 25)}$$

Therefore, $$\text{rd\_cycl\_dly} = \text{Ceil}((\text{tRC-tRCD-clk\_delay\_max+clk\_dly\_min+} \\ \text{RD\_WAIT}*\text{clkr})/\text{clkr})-1 \quad \text{(EQ 26)}$$

$$\text{wr\_cycl\_dly} = \text{Ceil}((\text{tRC-tRCD-clk\_dly\_max+clk\_dly\_min})/ \\ \text{clkr})-1 \quad \text{(EQ 27)}$$

$$\text{auto\_rfr\_cycle} = \text{Ceil}((\text{tRC/clkr})); \quad \text{(EQ 28)}$$

For different bank accesses:
rd_rd_dly (delay for a read allowed to other banks after current read);
rd_wr_dly (delay for a write allowed to other banks after current read);
wr_rd_dly (delay for a read allowed to other banks after current write);
wr_wr dly (delay for a write allowed to other banks after current write).

The following formulas compute starting and ending points for the use of the data bus during read and write operations:

$$\text{Read\_Data\_Start} = \text{clkr}+\text{cmd\_delay\_min}+\text{Remainder}(\text{clk\_dly}+ \\ \text{clk\_delay\_min-ctl\_dly-clk\_min, clkr})+\text{clkr}+\text{tSLZ}; \quad \text{(EQ 29)}$$

$$\text{Read\_Data\_End} = \text{clkr}+\text{cmd\_delay\_max}+\text{Remainder}(\text{clk\_dly}+ \\ \text{clk\_delay\_max-ctl\_dly-cmd\_delay\_max, clkr})+\text{RD\_} \\ \text{WAIT}*\text{clkr}+\text{clkr}+\text{tSHZ2}+\text{sdram\_mc\_dly\_max}; \quad \text{(EQ 30)}$$

$$\text{Write\_Data\_Start} = 1+\text{wr\_psh\_dly}+\text{mc\_sdram\_dly\_} \\ \text{min}; \quad \text{(EQ 31)}$$

$$\text{Write\_Data\_End} = 1+\text{wr\_psh\_dly}+\text{mc\_sdram\_dly\_} \\ \text{max}+\text{wrdata\_thld}; \quad \text{(EQ 32)}$$

Therefore, $$\text{rd\_rd\_dly} = \text{Ceil}((\text{Read\_Data\_End-Read\_Data\_Start})/ \\ \text{clkr})-1; \quad \text{(EQ 33)}$$

$$\text{rd\_wr\_dly} = \text{Ceil}((\text{Read\_Data\_End-Write\_Data\_Start})/ \\ \text{clkr})-1; \quad \text{(EQ 34)}$$

$$\text{wr\_rd\_dly} = \text{Ceil}((\text{Write\_Data\_End-Read\_Data\_Start})/ \\ \text{clkr})-1; \quad \text{(EQ 35)}$$

$$\text{wr\_wr\_dly} = \text{Ceil}((\text{Write\_Data\_End-Write\_Data\_Start})/ \\ \text{clkr})-1; \quad \text{(EQ 36)}$$

$$\text{rrd}[1:0] = \text{Ceil}((\text{tRRD}/\text{clkr})). \quad \text{(EQ 37)}$$

In the above derivation, legal settings are mathematically obtained to achieve the best idle latency for the MC. All legal settings are then checked for peak bandwidth performance. The memory system performance is measured in terms of read bandwidth and write bandwidth, expressed in bytes/sec. The bandwidth represents the rate of data transfer out of memory (read) or into it (write). The peak bandwidth performance will ultimately decide the best setting among all the legal settings obtained by the above equations.
For single bank:

$$\text{Read Bandwidth} = 1/\text{Ceil}(\text{clkr}(1+\text{act\_rd\_dly})+\text{rd\_cycle\_dly})/ \\ \text{clkr})\text{clkr}; \quad \text{(EQ 38)}$$

$$\text{Write Bandwidth} = 1/\text{Ceil}(\text{clkr}(1+\text{act\_wr\_dly})+\text{wr\_cycle\_dly})/ \\ \text{clkr})\text{clkr}; \quad \text{(EQ 39)}$$

Two Banks on One DIMM Set:

$$\text{Read Bandwidth} = 1/\text{Max}(\text{Ceil}(\text{clkr}(1+\text{act\_rd\_dly})+\text{rd\_cycle\_dly})/ \\ \text{clkr})\text{clkr}*2, \text{rd\_rd\_delay}*\text{clkr}); \quad \text{(EQ 40)}$$

$$\text{Write Bandwidth} = 1/\text{Max}(\text{Ceil}(\text{clkr}(1+\text{act\_wr\_dly})+\text{wr\_cycle\_} \\ \text{dly})/\text{clkr})\text{clkr}*2, \text{wr\_wr\_delay}*\text{clkr}); \quad \text{(EQ 41)}$$

Two Banks on Two DIMM Sets:

$$\text{Read Bandwidth} = 1/\text{Max}(\text{Ceil}(\text{clkr}(1+\text{act\_rd\_dly})+\text{rd\_cycle\_dly})/ \\ \text{clkr})*\text{clkr}, \text{rd\_rd\_dly}*\text{clkr})2*\text{clkr}); \quad \text{(EQ 42)}$$

$$\text{Write Bandwidth} = 1/\text{Max}(\text{Ceil}(\text{clkr}(1+\text{act\_wr\_dly})+\text{wr\_cycle\_} \\ \text{dly})/\text{clkr})*\text{clkr}, \text{wr\_wr\_dly}*\text{clkr})2*\text{clkr}); \quad \text{(EQ 43)}$$

Four Banks on Two DIMM Sets:

$$\text{Read Bandwidth} = 1/\text{Max}(\text{Ceil}(\text{clkr}*(1+\text{act\_rd\_dly})+\text{rd\_cycle\_} \\ \text{dly})/\text{clkr})*\text{clkr}, \text{rd\_rd\_dly}*\text{clkr}); \quad \text{(EQ 44)}$$

$$\text{Write Bandwidth} = 1/\text{Max}(\text{Ceil}(\text{clkr}*(1+\text{act\_wr\_dly})+\text{wr\_cycle\_} \\ \text{dly})/\text{clkr})*\text{clkr}, \text{wr\_wr\_dly}*\text{clkr}). \quad \text{(EQ 45)}$$

From the three pairs of the inequalities, the following margins can be calculated:

Command setup margin:

$$cmd\_setup\_margin = clk\_dly + clock\_delay\_min + N\ clkr - tSS - cmd\_dly - cmd\_delay\_max; \quad (EQ\ 46)$$

For the hold time:

$$cmd\_hold\_margin = cmd\_dly + cmd\_delay\_min - clk\_dly - clock\_delay\_max - N\ clkr - tSH; \quad (EQ\ 47)$$

MC data setup margin:

$$mc\_data\_setup\_margin = 1 + rd\_smp\_dly - (clkr(1 + act\_rd\_dly) + cmd\_delay\_max + Remainder(clk\_dly + clk\_delay\_max - cmd\_dly - cmd\_delay\_max, clkr) + tSAC2 - tSLZ + sdram\_mc\_data\_dly\_max + mc\_data\_setup); \quad (EQ\ 48)$$

MC data hold margin:

$$mc\_data\_hold\_margin = clkr(1 + act\_rd\_dly) + cmd\_delay\_min + Remainder(clk\_dly + clk\_delay\_min - cmd\_dly - cmd\_delay\_min, clkr) + tSAC2 - tSLZ + sdram\_mc\_data\_dly\_max + mc\_data\_setup); \quad (EQ\ 49)$$

SDRAM setup margin:

$$sdram\_data\_setup\_margin = clkr(1 + act\_wr\_dly) + cmd\_delay\_min + Remainder(clk\_dly + clk\_delay\_min - cmd\_delay - cmd\_delay\_min, clkr) - (1 + wr\_psh\_dly + mc\_dram\_dly\_max + tSS); \quad (EQ\ 50)$$

SDRAM hold margin:

$$sdram\_data\_hold\_margin = 1 + wr\_psh\_dly + mc\_dram\_dly\_min + wrdata\_thld - tSH - (clkr(1 + act\_wr\_dly) + cmd\_delay\_max + Remainder(clk\_dly + clk\_delay\_max\ cmd\_dly - cmd\_delay\_max, clkr)); \quad (EQ\ 51)$$

With these margin performance numbers, the best legal setting can be obtained easily.

Figure 8:
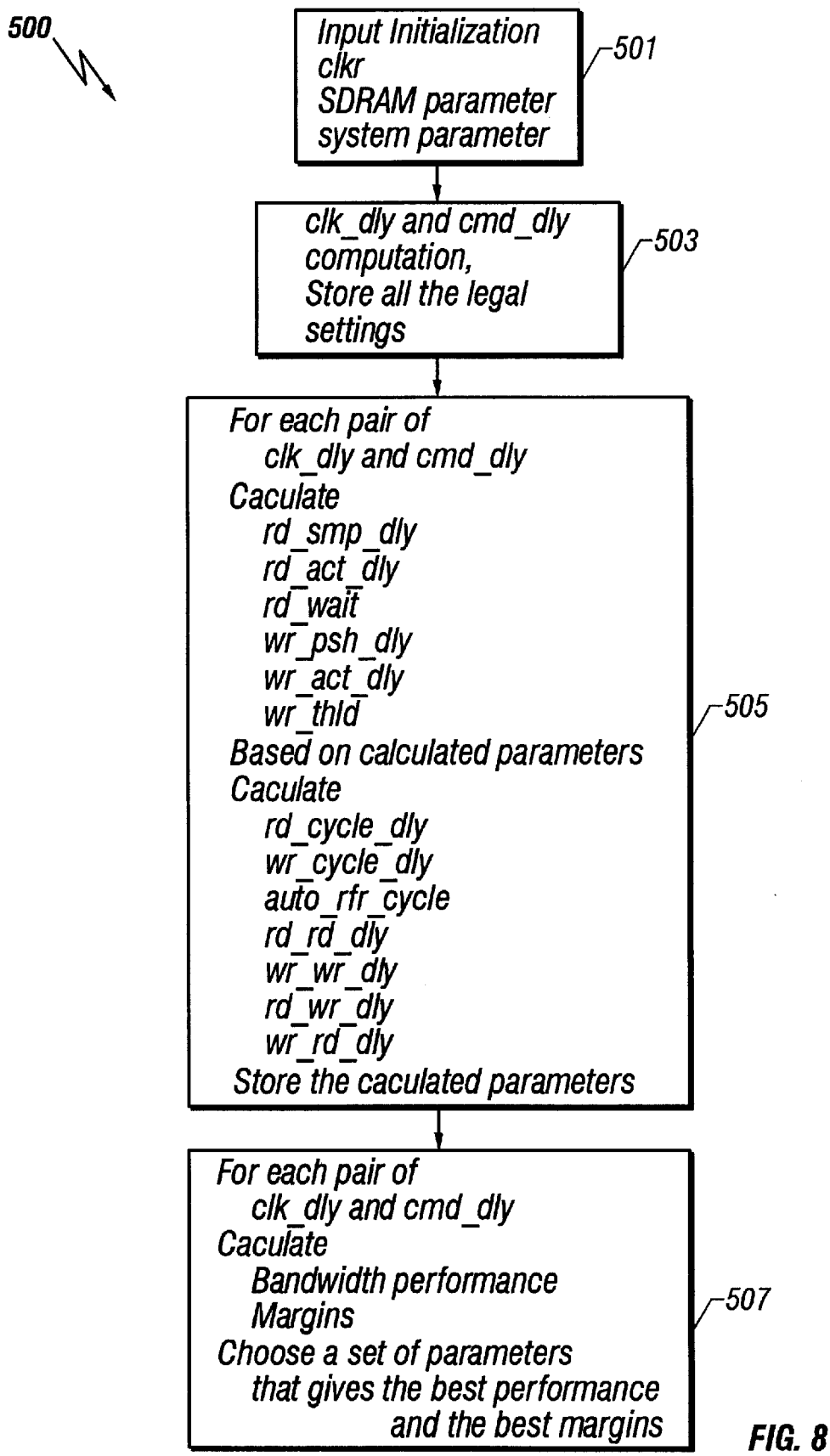
FIG. 8 is an algorithmic flowchart describing timing parameter calculations for programming a memory controller in accordance with one embodiment of the invention.

The MC programming method is now ready for implementation. The flow chart 500 for the MC programmable parameter calculation is described in FIG. 8. The first step 501 is initialization of all inputs, including the SDRAM parameters in Table 1, system parameters in Table 3 and the time period ratio parameter clkr. The next step 503 includes storing all the legal settings described in Table 3 and the computation of programmable time delays clk_dly and cmd_dly. In the third step 505, for each pair of clk_dly and cmd_dly, the parameters rd_smp_dly, rd_act_dly, rd_wait, wr_psh_dly, wr_act_dly and wr_thld are calculated. Based on these calculated parameters, the parameters rd_cycle_dly, wr_cycle_dly, auto_rfr_cycle, rd_rd_dly, wr_wr_dly, rd_wr_dly and wr_rd_dly are calculated. All the calculated parameters are stored.

In the last step 507, for each pair of clk_dly and cmd_dly, memory bandwidth performance and margins are calculated from the above mentioned equations. Then, a set of parameters is chosen that give the best performance and the best margins.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. A method for programming a controller of a memory unit comprising:

inputting a plurality of initialization parameters of the memory unit;

calculating a set of pairs of clock delays and command delays using the plurality of initialization parameters;

calculating a set of read command parameters for each pair of clock delays and command delays;

calculating a set of write command parameters for each pair of clock delays and command delays;

calculating a set of system performance measures for each pair of clock delays and command delays, using the set of read command parameters and the set of write command parameters; and selecting the pair of clock delay and command delay and the set of read command parameters and write command parameters calculated therefrom that offer optimum system performance.

2. The method of claim 1, wherein the plurality of initialization parameters comprises:

system parameters;

device parameters of a SDRAM unit; and a time period ratio of a system clock and a SDRAM unit clock.

3. The method of claim 1, wherein the system performance comprises:

bandwidth performance; and margin performance.

4. The method of claim 1, wherein the set of read command delays comprises:

a sample delay;

a RAS to CAS delay;

a valid extension delay;

a pre-charge delay;

an auto-refresh delay; and a delay for other banks after a current command.

5. The method of claim 1, wherein the set of write command delays comprises:

a push delay;

a RAS to CAS delay;

a valid extension delay;

a pre-charge delay;

an auto-refresh delay; and a delay for other banks after a current command.

6. The method of claim 1, wherein the memory unit supports a single microprocessor.

7. The method of claim 1, wherein the memory unit supports a plurality of microprocessors.

* * * * *

UNITED STATES PATENT AND TRADEMARK OFFICE
CERTIFICATE OF CORRECTION

PATENT NO. : 6,553,472 B2
DATED : April 22, 2003
INVENTOR(S) : Liuxi Yang et al

It is certified that error appears in the above-identified patent and that said Letters Patent is hereby corrected as shown below:

<u>Column 9,</u>
Line 4, change "wr psh dly" to read -- wr_psh_dly --.

Signed and Sealed this

First Day of July, 2003

JAMES E. ROGAN
*Director of the United States Patent and Trademark Office*